United States Patent

Imai

[11] 3,953,112
[45] Apr. 27, 1976

[54] BEHIND-STOP TYPE COMPACT PHOTOGRAPHIC LENS SYSTEM

[75] Inventor: Toshihiro Imai, Fuchu, Japan

[73] Assignee: Olympus Optical Co., Ltd., Tokyo, Japan

[22] Filed: May 17, 1974

[21] Appl. No.: 471,058

[30] Foreign Application Priority Data
May 19, 1973  Japan.................... 48-55192

[52] U.S. Cl. ............................................... 350/227
[51] Int. Cl.² ........................................... G02B 9/20
[58] Field of Search ................................. 350/227

[56] References Cited
UNITED STATES PATENTS

| | | | |
|---|---|---|---|
| 2,158,178 | 5/1934 | Frederick et al. | 350/227 |
| 2,165,328 | 7/1939 | Aklin et al. | 350/227 |

FOREIGN PATENTS OR APPLICATIONS

| | | | |
|---|---|---|---|
| 314,696 | 8/1956 | Switzerland | 350/227 |
| 520,475 | 4/1948 | United Kingdom | 350/227 |

*Primary Examiner*—Paul A. Sacher
*Attorney, Agent, or Firm*—Cushman, Darby & Cushman

[57] ABSTRACT

A behind-stop type compact photographic lens system comprising three lens components of four lenses, which is arranged to satisfy the following conditions for the purpose of preventing insufficient marginal ray and favourably correcting various aberrations:

(1) $0.7f < r_2 < 2f$
(2) $f < -r_3 < 1.8f$
(3) $0.5f < r_5 < 2f$
(4) $0.25f < -r_6 < 0.4f$
(5) $d_2 + d_4 < 0.12f$
(6) $n_2 < 1.75$
(7) $5 < \nu_3 - \nu_4$ wherein reference symbol $f$ represents a focal length of the lens system as a whole, reference symbols $r_2$, $r_3$, $r_5$ and $r_6$ respectively represent radii of curvatures of the surface of the first lens component on the image side, the surface of the second lens component on the object side, the third lens component on the object side and the cemented surface of the third lens component, reference symbols $d_2$ and $d_4$ respectively represent airspaces between the first and second lens components and between the second and third lens components, reference symbol $n_2$ represents the refractive index of the second lens component, and reference symbols $\nu_3$ and $\nu_4$ respectively represent Abbe's numbers of the front and rear lens elements of the third lens component.

3 Claims, 7 Drawing Figures

SPHERICAL
ABERRATION

F 3.5

5.6

-0.01  0  0.01

ASTIGMATISM

31° 30'

22° 51'

-0.01  0  0.01

DISTORTION

-2  0  2 (%)

FIG. 3A
SPHERICAL ABERRATION
FIG. 3B
ASTIGMATISM
FIG. 3C
DISTORTION
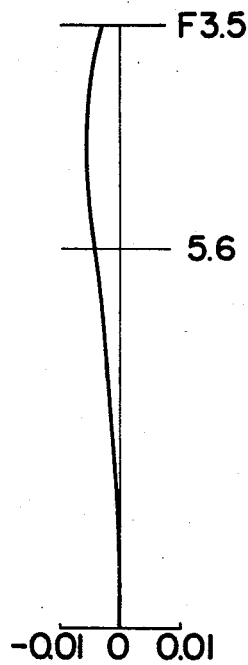
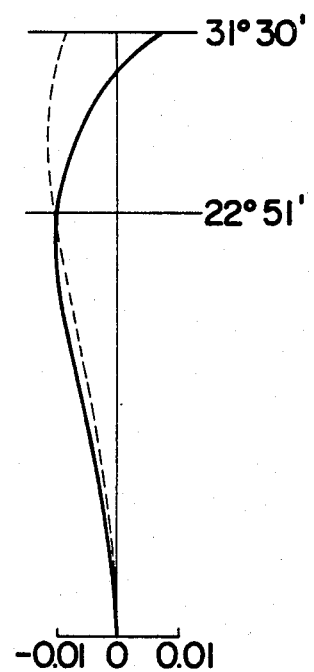
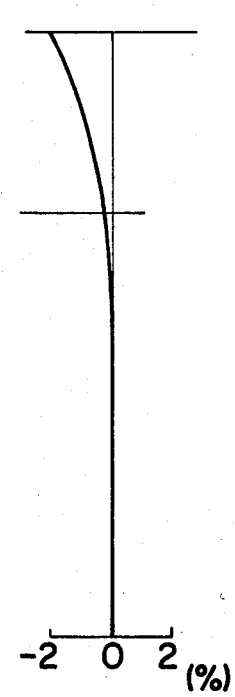

BEHIND-STOP TYPE COMPACT PHOTOGRAPHIC LENS SYSTEM

BACKGROUND OF THE INVENTION a. Field of the Invention

The present invention relates to a photographic lens system and, more particularly, to a behind-stop type compact photographic lens system having a semi-wide field angle of 63° and aperture ratio F:3.5.

b. Description of the Prior Art

Behind-stop type photographic lens systems generally have a disadvantage that marginal ray becomes insufficient because a part of photographing light is cut.

SUMMARY OF THE INVENTION

It is therefore, the primary object of the present invention to provide a behind-stop type lens system of Tesser type comprising a third lens component arranged as a positive cemented doublet, its cemented surface being concave toward the object side.

The lens system according to the present invention is a Tesser type lens system comprising three lens components wherein a first lens component is a positive meniscus lens, a second lens component is a biconcave lens and a third lens component is a positive cemented doublet, and satisfying the following conditions.

1. $0.7f < r_2 < 2f$
2. $f < -r_3 < 1.8f$
3. $0.5f < r_5 < 2f$
4. $0.25f < -r_6 < 0.4f$
5. $d_2 + d_4 < 0.12f$
6. $n_2 < 1.75$
7. $5 < \nu_3 - \nu_4$

In the above conditions, reference symbol $f$ represents a focal length of the lens system as a whole, and reference symbols $r_2$, $r_3$, $r_5$ and $r_6$ respectively represent radii of curvatures of the surface of the first lens component on the image side, the surface of the second lens component on the object side, the surface of the third lens component on the object side and the cemented surface of the third lens component. Reference symbols $d_2$ and $d_4$ respectively represent airspaces between the first and second lens components and between the second and third lens components. Reference symbol $n_2$ represents the refractive index of the second lens component. Reference symbols $\nu_3$ and $\nu_4$ respectively represent Abbe's numbers of the front and rear lens elements of the third lens component.

In the above-mentioned lens system according to the present invention, surfaces $r_2$, $r_3$ and $r_5$ serve to favourably correct spherical aberration of the lens system. For this purpose, insufficient correction of spherical aberration is prevented by selecting radii of curvatures of said surfaces as $0.7f < r_2$, $f < -r_3$ and $0.5f < r_5$ as shown in conditions (1), (2) and (3). In said conditions (1), (2) and (3), portions $r_2 < 2f$, $-r_3 < 1.8f$ and $r_5 < 2f$ are established for the purpose of assuring symmetry of off-axial coma and minimizing astigmatism.

Besides, for the lens system according to the present invention, Petzval's sum which tends to become a large positive value is made small and inclination of the image surface is prevented by defining the refractive index of the second lens component as $n_2 < 1.75$ as shown by the condition (6).

Furthermore, the third lens component of the lens system according to the present invention has an effect to correct chromatic aberration and, for this purpose, it is arranged so that Abbe's numbers of the front and rear lens elements of this cemented lens satisfy the condition (7), i.e., $5 < \nu_3 - \nu_4$. Moreover, by arranging the cemented surface $r_6$ of said third lens component so that it satisfies $0.25f < -r_6$ in the condition (4) and also by adequately distributing powers of the front and rear lens components of this cemented lens, axial chromatic aberration of the lens system is corrected favourably. Besides, when it is so arranged that said cemented surface $r_6$ of the third lens component satisfies $-r_6 < 0.4f$, off-axial chromatic aberration, i.e., coma of lateral chromatic aberration is corrected favourably. This condition $-r_6 < 0.4f$ is also necessary for achieving a compact arrangement of a lens system with a short back focal length which is one of characteristics of the lens system according to the present invention. For the lens system according to the present invention which is of the behindstop type, it is required to prevent insufficient marginal ray. The condition (5), i.e., $d_2 + d_4 < 0.12f$, is for solving this problem.

In addition, when refractive indexes $n_1$ and $n_3$ of convex lenses, i.e. of the first lens component and the lens element on the object side of the third lens component, are larger, Petzval's sum can be made smaller. When refractive indexes $n_1$ and $n_3$ are made larger as mentioned in the above, it is also possible to make absolute values of radii of curvatures of respective surfaces of said lenses larger. Consequently, it is possible to make zonal spherical aberration smaller. Therefore, it is preferable that said refractive indexes $n_1$ and $n_3$ are larger than 1.7. It is, however, not preferable to make refractive indexes too large because extremely special material is required for lenses. Therefore, the lens system according to the present invention is designed to use materials of refractive indexes smaller than 1.81 for lenses and, at the same time, the above-mentioned effect can be achieved quite satisfactorily.

BRIEF DESCRIPTION OF THE DRAWINGS

FIGS. 2A, 2B, 2C, 3A, 3B and 3C show graphs of aberrations of respective embodiments of the lens system according to the present invention.

DETAILED DESCRIPTION OF PREFERRED EMBODIMENTS

Figure 1:
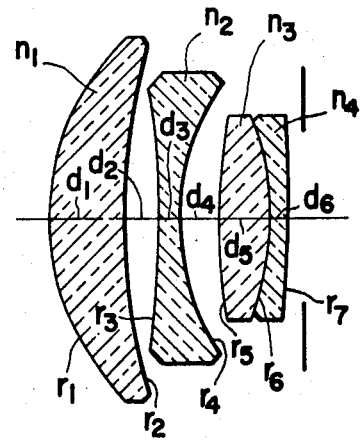
FIG. 1 shows a sectional view of the lens system according to the present invention.

The concrete arrangement of the lens system according to the present invention is as shown in FIG. 1 and preferred embodiments of said lens system are as shown below.

Embodiment 1

| | | | |
|---|---|---|---|
| $r_1 = 0.3272$ | | | |
| $r_2 = 0.8200$ | $d_1 = 0.096$ | $n_1 = 1.7859$ | $\nu_1 = 44.24$ |
| $r_3 = -1.3518$ | $d_2 = 0.032$ | | |
| $r_4 = 0.3201$ | $d_3 = 0.028$ | $n_2 = 1.6727$ | $\nu_2 = 32.10$ |
| $r_5 = 0.9076$ | $d_4 = 0.052$ | | |
| $r_6 = -0.3355$ | $d_5 = 0.072$ | $n_3 = 1.720$ | $\nu_3 = 50.36$ |
| $r_7 = -0.8984$ | $d_6 = 0.024$ | $n_4 = 1.58144$ | $\nu_4 = 40.75$ |
| | $f = 1.0$ | F 1:3.5 | $2\omega = 63°$ |

Embodiment 2

| | | | |
|---|---|---|---|
| $r_1 = 0.3308$ | | | |
| $r_2 = 0.7993$ | $d_1 = 0.1$ | $n_1 = 1.7859$ | $\nu_1 = 44.24$ |

-continued

| | $d_2 = 0.048$ | | |
|---|---|---|---|
| $r_3 = -1.3836$ | $d_3 = 0.028$ | $n_2 = 1.69895$ | $\nu_2 = 30.12$ |
| $r_4 = 0.3149$ | $d_4 = 0.052$ | | |
| $r_5 = 0.7637$ | $d_5 = 0.072$ | $n_3 = 1.720$ | $\nu_3 = 50.36$ |
| $r_6 = -0.3610$ | $d_6 = 0.024$ | $n_4 = 1.56444$ | $\nu_4 = 43.78$ |
| $r_7 = -0.9052$ | $f = 1.0$ | F 1:3.5 | $2\omega = 63°$ | wherein reference symbols $r_1$, $r_2$, $r_3$, $r_4$, $r_5$, $r_6$ and $r_7$ respectively represent radii of curvatures of the respective lens surfaces, reference symbols $d_1$, $d_2$, $d_3$, $d_4$, $d_5$ and $d_6$ respectively represent thicknesses of respective lenses and airspaces between respective lenses, reference symbols $n_1$, $n_2$, $n_3$ and $n_4$ respectively represent refractive indexes of respective lenses, and reference symbols $\nu_1$, $\nu_2$, $\nu_3$, and $\nu_4$ respectively represent Abbe's numbers of respective lenses.

Figure 2A:
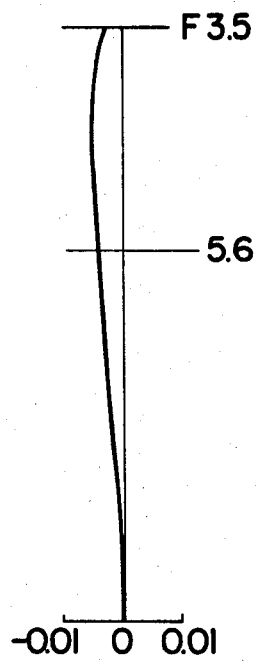
Figure 2B:
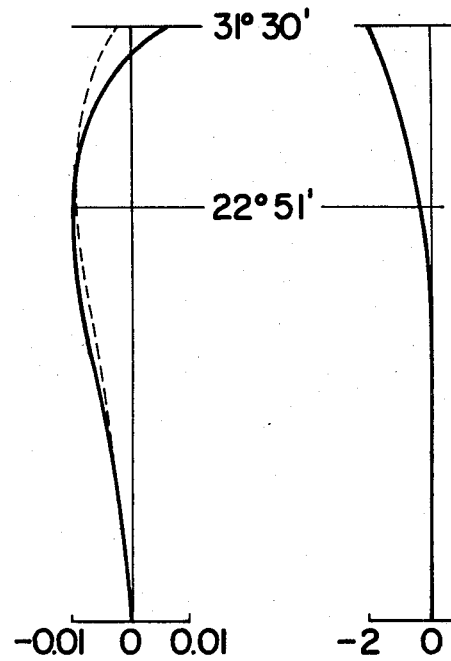
Figure 2C:
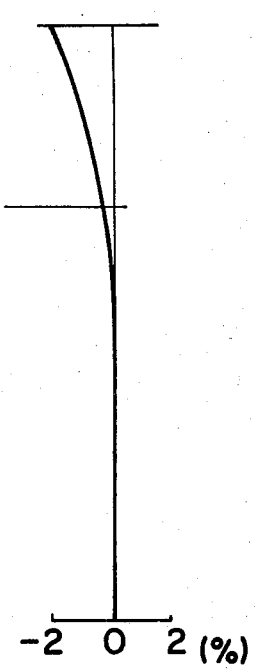

Aberration curves of the above embodiments are as shown in FIGS. 2A, 2B, 2C, 3A, 3B and 3C. FIGS. 2A and 2C shows aberration curves of the Embodiment 1. Out of them, FIG. 2A shows spherical aberration, FIG. 2B shows astigmatism and FIG. 2C shows distortion. FIGS. 3A through FIG. 3C show aberration curves of the Embodiment 2. That is, FIG. 3A shows spherical aberration, FIG. 3B shows astigmatism and FIG. 3C shows distortion.

As it is evident from the above embodiments and their aberration curves, the lens system according to the present invention is a very compact behind-stop type photographic lens system for which aberrations are corrected quite favourably.

I claim:

1. A behind-stop type compact photographic lens system comprising three lens components, a first lens component being a positive meniscus lens, a second lens component being a biconcave lens and a third lens component being a cemented positive doublet lens, and said behind-stop type photographic lens system satisfying the following conditions:

1. $0.7f < r_2 < 0.87f$
2. $f < -r_3 < 1.4f$
3. $0.6f < r_5 < 0.92f$
4. $0.29f < -r_6 < 0.38f$
5. $0.08f < d_2 + d_4 < 0.11f$
6. $1.65 < n_2 < 1.72$
7. $6 < \nu_3 - \nu_4 < 10$ wherein reference symbol f represents a focal length of the lens system as a whole, reference symbols $r_2$, $r_3$, $r_5$ and $r_6$ respectively represent radii of curvatures of the surface of the first lens component on the image side, the surface of the second lens component on the object side, the surface of the third lens component on the object side and the cemented surface of the third lens component, reference symbols $d_2$ and $d_4$ respectively represent airspaces between the first and second lens components and between the second and third lens components, reference symbol $n_2$ represents the refractive index of the second lens component, and reference symbols $\nu_3$ and $\nu_4$ respectively represent Abbe's numbers of the front and rear lens elements of the third lens component.

2. A behind-stop type compact photographic lens system comprising three lens components, a first lens component being a positive meniscus lens, a second lens component being a biconcave lens and a third lens component being a cemented positive doublet lens, and having the following numerical values:

| | $d_1 = 0.096$ | $n_1 = 1.7859$ | $\nu_1 = 44.24$ |
|---|---|---|---|
| $r_1 = 0.3272$ | | | |
| $r_2 = 0.8200$ | $d_2 = 0.032$ | | |
| $r_3 = -1.3518$ | $d_3 = 0.028$ | $n_2 = 1.6727$ | $\nu_2 = 32.10$ |
| $r_4 = 0.3201$ | $d_4 = 0.052$ | | |
| $r_5 = 0.9076$ | $d_5 = 0.072$ | $n_3 = 1.720$ | $\nu_3 = 50.36$ |
| $r_6 = -0.3355$ | $d_6 = 0.024$ | $n_4 = 1.58144$ | $\nu_4 = 40.75$ |
| $r_7 = -0.8984$ | $f = 1.0$ | F 1:3.5 | $2\omega = 63°$ | wherein reference symbols $r_1$, $r_2$, $r_3$, $r_4$, $r_5$, $r_6$ and $r_7$ respectively represent radii of curvatures of respective lens surfaces, reference symbols $d_1$, $d_2$, $d_3$, $d_4$, $d_5$ and $d_6$ respectively represent thicknesses of respective lenses and airspaces between respective lenses, reference symbols $n_1$, $n_2$, $n_3$ and $n_4$ respectively represent refractive indexes of respective lenses, and reference symbols $\nu_1$, $\nu_2$, $\nu_3$ and $\nu_4$ respectively represent Abbe's numbers of respective lenses.

3. A behind-stop type compact photographic lens system comprising three lens components, a first lens component being a positive meniscus lens, a second lens component being a biconcave lens and a third lens component being a cemented positive doublet lens, and having the following numerical values:

| | $d_1 = 0.1$ | $n_1 = 1.7859$ | $\nu_1 = 44.24$ |
|---|---|---|---|
| $r_1 = 0.3308$ | | | |
| $r_2 = 0.7993$ | $d_2 = 0.048$ | | |
| $r_3 = -1.3836$ | $d_3 = 0.028$ | $n_2 = 1.69895$ | $\nu_2 = 30.12$ |
| $r_4 = 0.3149$ | $d_4 = 0.052$ | | |
| $r_5 = 0.7637$ | $d_5 = 0.072$ | $n_3 = 1.720$ | $\nu_3 = 50.36$ |
| $r_6 = -0.3610$ | $d_6 = 0.024$ | $n_4 = 1.56444$ | $\nu_4 = 43.78$ |
| $r_7 = -0.9052$ | $f = 1.0$ | F 1:3.5 | $2\omega = 63°$ | wherein reference symbols $r_1$, $r_2$, $r_3$, $r_4$, $r_5$, $r_6$ and $r_7$ respectively represent radii of curvatures of respective lens surfaces, reference symbols $d_1$, $d_2$, $d_3$, $d_4$, $d_5$ and $d_6$ respectively represent thicknesses of respective lenses and airspaces between respective lenses, reference symbols $n_1$, $n_2$, $n_3$ and $n_4$ respectively represent refractive indexes of respective lenses, and reference symbols $\nu_1$, $\nu_2$, $\nu_3$ and $\nu_4$ respectively represent Abbe's numbers of respective lenses.

* * * * *